United States Patent [19]
Parkinson

[11] 3,851,525
[45] Dec. 3, 1974

[54] THRUST-METER UTILIZING A PHASE MEASUREMENT SYSTEM FOR THURST MEASUREMENT

[76] Inventor: James R. Parkinson, 150 White Plains Rd., Tarrytown, N.Y. 10591

[22] Filed: Oct. 13, 1972
(Under Rule 47)

[21] Appl. No.: 297,304

[52] U.S. Cl. .................................................. 73/140
[51] Int. Cl. ............................................. G01l 5/12
[58] Field of Search... 73/117.4, 140, 136 R, 136 A, 73/136 B, 136 C

[56] References Cited
UNITED STATES PATENTS

| | | |
|---|---|---|
| 920,218 | 5/1909 | Thamer ............................... 73/140 |
| 2,349,653 | 5/1944 | Godsey, Jr. ........................... 73/140 |
| 3,104,544 | 9/1963 | Guiot ................................ 73/136 A |
| 3,538,762 | 11/1970 | Parkinson et al. ................ 73/136 A |
| 3,548,649 | 12/1970 | Parkinson .......................... 73/136 A |
| 3,604,255 | 9/1971 | Bart ................................... 73/136 A |

*Primary Examiner*—Charles A. Ruehl
*Attorney, Agent, or Firm*—Edwin E. Greigg

[57] ABSTRACT

A thrustmeter which converts the axial deflection of a drive diaphragm into rotary displacement of a toothed wheel with respect to a second reference toothed wheel by means of a slotted cam and follower so that the phase displacement between the teeth of the wheels is indicative of thrust and may be sensed magnetically or other wise, the signals being reduced electronically and displayed on a meter.

13 Claims, 8 Drawing Figures

THRUST-METER UTILIZING A PHASE MEASUREMENT SYSTEM FOR THURST MEASUREMENT

BACKGROUND OF THE INVENTION

Propulsion system parameters of ships are monitored to determine the effects of operating parameters on cost and efficiency. The parameters which are monitored are usually the torque and speed of the propulsion shaft which give an indication of the shaft horsepower to the propeller and thereby allow an estimate of the thrust. Ideally a direct reading of the thrust of a ship's propeller is needed to determine the efficiency of the propeller. As the ship gets older and is in service for some time, the efficiency of the hull and propeller decreases due to buildup of scales, etc. which must be removed at intervals in order to maintain top speed and lower operating costs. These effects vary from ship to ship and depend to a large extent upon the environment in which the ship operates. Maintenance is performed at regular intervals which is very costly rather than based upon quantitative performance.

A thrustmeter can therefore give a new ability to the ship operator in giving a precise measure of propeller efficiency.

The thrustmeter can also be applied equally well to many types of aircraft and other vehicles where the thrust load on a rotating shaft may be of interest.

The present invention translates the deflection of a thrust diaphragm into a phase measurement system similar to my U.S. Pat. No. 3,548,649 issued Dec. 22, 1970, entitled Torque Measurement System Utilizing Shaft Deflection And Phase Displacement Technique, wherein the intermeshed teeth of a reference toothed wheel and a thrust-responsive toothed wheel, which are rotating with the shaft, change spacing proportional to the torque and this spacing is sensed by magnetic or other sensors and the signal processed and applied to a readout device. In the present invention the spacing is made proportional to the deflection of the thrust diaphragm, thus, the phase measurement can be processed and read as thrust rather than torque.

It is therefore the principal object of this invention to provide a thrust measurement system using phase displacement techniques for improved accuracy.

It is a further object of this invention to provide a thrust measurement system in which the thrust may be read at a remote point.

Another object of this invention is to provide a thrust measurement system utilizing non-contacting methods for the sensing of thrust.

Yet another object of this invention is to provide a thrust measurement system which will measure the thrust on a rotating power shaft during actual operation.

Still another object of this invention is to provide a thrust measurement system in which the displacement of a thrust diaphragm is translated into a rotational change in a thrust-responsive toothed wheel.

These and other objects of this inventions will become clear upon careful study of the specification along with the drawings and appended claims.

DESCRIPTION OF THE DRAWINGS

Referring now to FIG. 1, there is shown a power shaft 10 which extends from the prime mover and has concentrically mounted upon it a drive flange means 11 which is forced to rotate with the power shaft 10 by key means 12 disposed in a suitable key slot in shaft 10 and drive flange 11 as is well known to the art. Mounted concentrically with the drive flange means 11 by bolts 13 or other means is a thrust diaphragm means 14 extending redially and angularly outwardly similar to a Belleville spring with bolt flange 15 around its periphery, said diaphragm means being soft in a direction axially concentric with the power shaft 10 and torsionally and radially stiff. Bolted to the bolt flange 15 of the thrust diaphragm means 14 is the bolt flange 16 of the second thrust diaphragm means 17 which is similar to the thrust diaphragm means 14 but reversed in orientation as clearly shown in FIG. 1. The center of the thrust diaphragm means 17 is bolted or otherwise affixed to the drive flange 18 which is mounted concentrically on output shaft 19 and drives the output shaft 19 in rotation through key 20 which is disposed in key slots in the output shaft 19 and drive flange 18 as is well known to the art.

Figure 1:
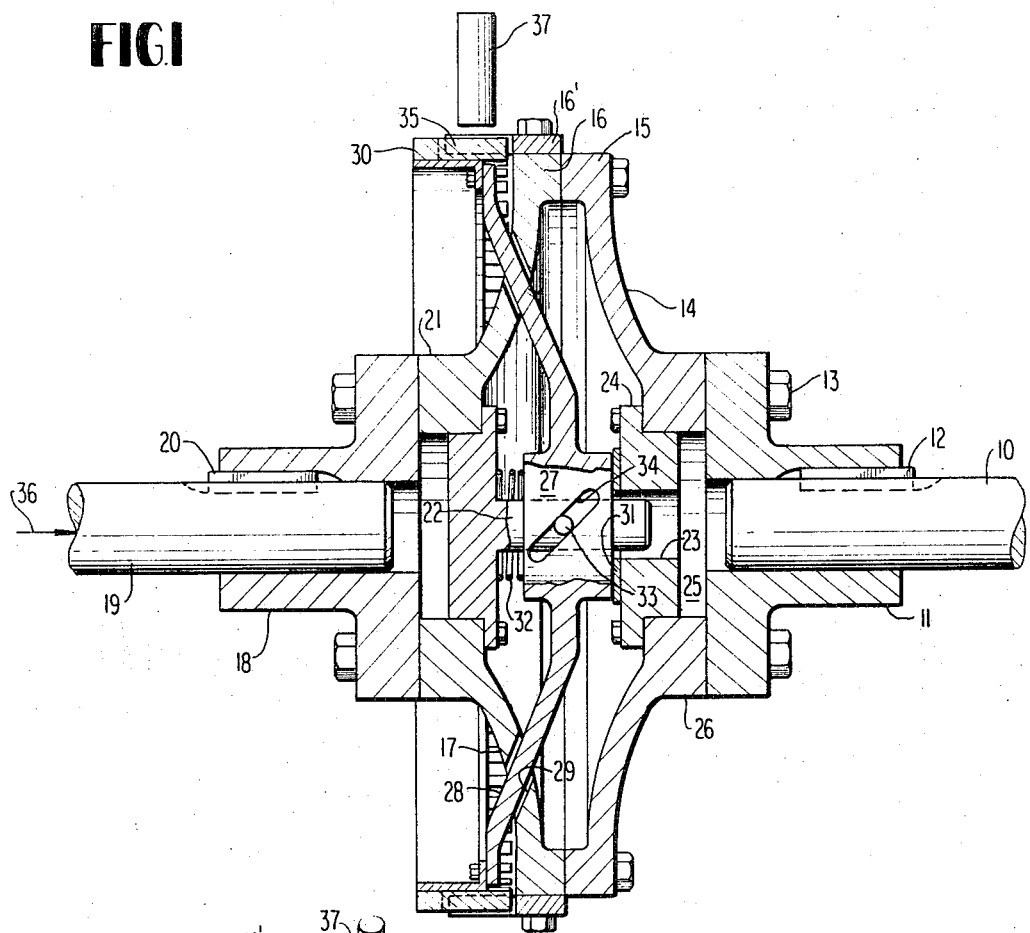
FIG. 1 shows a basic embodiment of the invention using toothed intermeshed sensing wheels.
Figure 2:
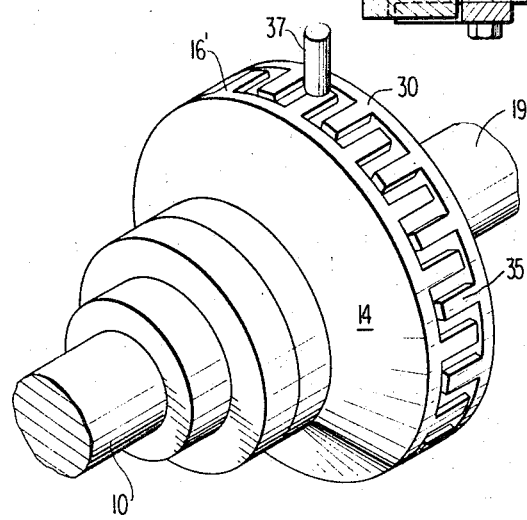
FIG. 2 is a generally perspective view of the assembly of FIG. 1 showing the sensor and the teeth but lacking further details apparent in FIG. 1.

Thus far one will recognize the construction as a flexible driving joint, axially soft and torsionally and radially stiff so that power shaft 10 can drive the output shaft 19 through diaphragms 14 and 17, while said shafts can move axially towards or away from each other. Fitted to the outer cylindrical surface of bolt flange 16 is toothed rim 16' bolted or otherwise rigidly affixed to bolt flange 16 and which has equally spaced teeth extending axially from it as shown for purposes to be presently discussed. Referring now to the central portion of FIG. 1, one sees that the center of thrust diaphragm hub 21 is concentrically perforated to receive the follower guide shaft 22 which is concentrically affixed to hub 21 and extends with radial clearance into perforation 23 in thrust plate 24 which is concentrically disposed and affixed in a suitable perforation 25 in thrust diaphragm hub 26 of thrust diaphragm 14. Slidably and rotatably fitted onto the follower guide shaft 22 is a hub 27 of the thrust-responsive toothed wheel 28 which has extending radially and angularly outward a plurality of arms that project between the legs 29 of the thrust diaphragm means 17 as clearly shown in FIG. 1 the arms of 28 being adapted to support the toothed rim 30 of toothed thrust-responsive wheel 28 concentrically with output shaft 19 and power shaft 10.

Toothed rim 30 has extending axially from it teeth 35 which are equal in number to those extending from toothed rim 16' and intermeshed with them. Also slidably fitted on follower guide shaft 22 is thrust bearing 31 disposed between hub 27 and thrust plate 24 and spring 32 disposed between hub 27 and the vertical face of follower guide shaft 22, thus urging hub 27 towards thrust bearing 31 and thrust plate 24. The follower guide pin 33 extends radially and is rigidly affixed to follower guide shaft 22 closely and slidably engaging cam slot 34 which is cut into hub 27 of toothed thrust-responsive wheel 28. It should be obvious that as toothed thrust wheel 28 moves axially on the follower guide shaft 22, it will rotate with respect to the thrust diaphragms 14 and 17 and thereby move the teeth 35 of toothed rim 30 with relation to those of toothed rim 16', thus changing the spacing between them.

In normal "no thrust" condition, the teeth 35 of toothed rim 30 are intermeshed with those of toothed rim 16' so they have equal spaces between them. As thrust is applied on the output shaft 19 as indicated by arrow 36, thrust diaphragms 14 and 17 deflect, causing follower guide pin 33 to move towards power shaft 10, applying a force to cam slot 34, thereby causing toothed thrust-responsive wheel 28 to rotate, changing the spacing between the teeth in relation to the thrust and deflection of the diaphragms.

Referring again to the upper central portion of FIG. 1, there is shown magnetic sensor 37 mounted in close proximity to teeth 35 so that as said teeth which are made of magnetic material pass the face of said sensor, the flux in the air gap changes which is sensed by said sensor and converted into an electrical signal as is well known to the art.

This embodiment uses intermeshed teeth, which embodiment is similar to my U.S. Pat. No. 3,548,649, issued Dec. 22, 1970.

Figure 3:
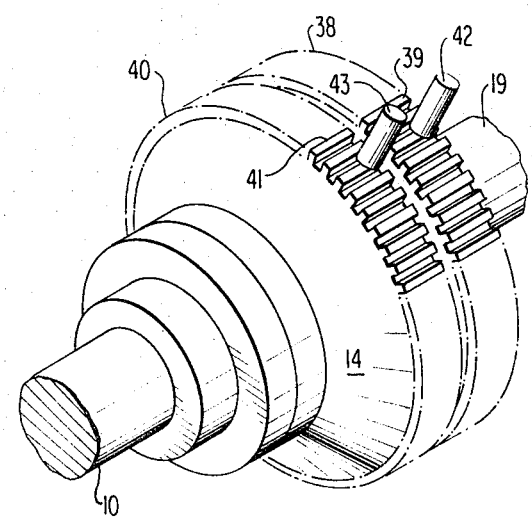
FIG. 3 shows a schematic perspective of a second embodiment of the invention using separate toothed sensing wheels.

An alternative embodiment can be made utilizing the separated gears as shown in FIG. 3. Referring to FIG. 3, one will recognize its similarity to FIG. 1 wherein the power shaft 10 is the input shaft and drives thrust diaphragm 14 which drives thrust diaphragm 17 and output shaft 19. Mounted on the outer periphery of thrust diaphragms 14, 17 is external ring gear 40 having teeth 41 extending radially outward. Toothed thrust-responsive wheel 28 (not visible in FIG. 3) is constructed and operates in an identical manner to that shown in FIG. 1 except that toothed rim 30 (FIG. 1) has been replaced by external ring gear 38 (FIG. 3) having teeth 39 extending radially outward, the gear 40 being spaced axially from the ring gear 38 as clearly shown. Mounted in close proximity to gear teeth 39 of ring gear 38 is the sensor 42 to sense the passage of said teeth as the air gap between the gear 38 and sensor 42 changes. Also, mounted in close proximity to gear teeth 41 of ring gear 40 is sensor 43 to sense the passage of said teeth. Those familiar with the art will realize that in this embodiment the phase of the signals sensed by sensors 42 and 43 will be indicative of the thrust.

One skilled in the art will recognize that many combinations exist which will improve the accuracy and usefulness of this basic thrustmeter concept as described.

By addition of a third wheel to the embodiment of FIG. 3 and a third sensor to sense its position, compensation for shaft sensor misalignment can be achieved as shown in my U.S. Pat. No. 3,538,762, issued Nov. 10, 1970 and entitled Phase Displacement Torque Measuring System With Shaft Misalignment Compensation Technique.

Compensation for bearing play and shaft misalignment can also be achieved by the addition of a second set of sensors mounted diametrically opposite the first set shown in FIG. 3 as clearly described in my copending patent application Ser. No. 266,628, filed June 27, 1972, entitled Two Sensor Torque Measuring Apparatus With Compensation For Shaft Misalignment.

Movable sensing means may be added to measure thrust or drag at very low rpm, said movable sensing means maintains the differential speed between the toothed wheels and sensors to produce usable signals. This will also allow the measurement of drag on a multi-propeller system if one propeller is stopped for any reason.

The signal processing for the two embodiments depicted will now be described. In FIG. 1 under a no thrust condition, the intermeshed teeth extending from rims 30 and 16' are arranged to be equally spaced from each other and therefore induce in sensor 37 a sine wave with uniformly spaced peaks. As thrust is applied the spacing between said intermeshed teeth becomes unequal with the space between every other set of teeth becoming smaller and the alternate spaces becoming larger which induces in the sensor a distorted sine wave with two peaks close together and the next two peaks farther apart.

Figure 4:
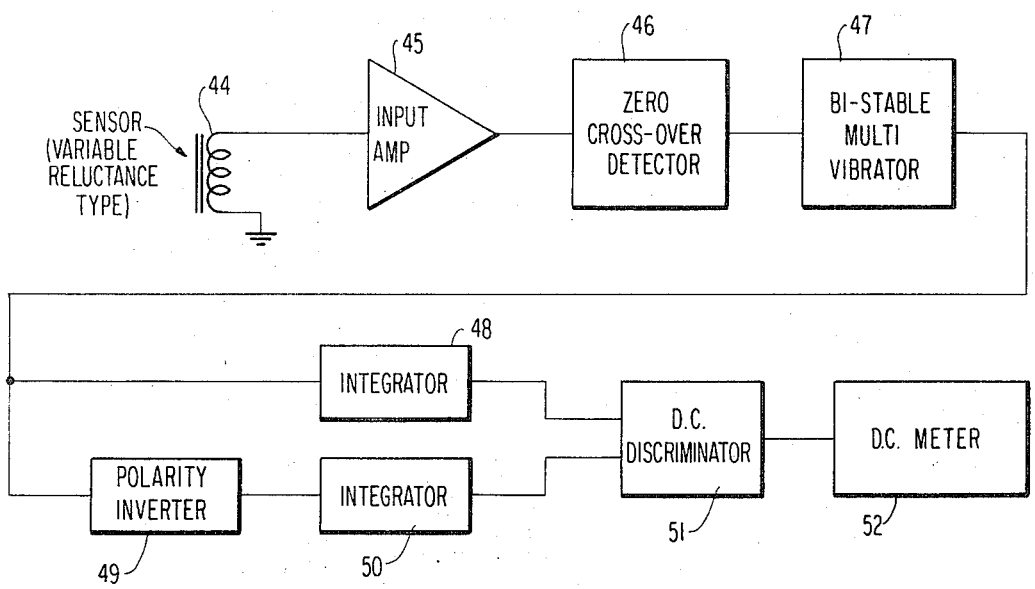
FIG. 4 shows a schematic of one circuit which will reduce the sensor information to a DC voltage proportional to thrust for the embodiment of FIG. 1.

Referring now to FIG. 4, one sees sensor coil 44 of sensor 37 connected to input amplifier 45 which has a very high gain and converts the sine wave input into a square wave with the vertical side of the wave at the zero crossover point. The output of input amplifier 45 is then connected to the zero crossover detector 46 which produces a detection signal or "spike" at each zero crossover point. The positive spikes are blocked and the negative spikes only of the output of zero crossover detector 46 are applied to the input of bistable multivibrator 47 whose output turns on when a pulse is applied, then off, when a second pulse is applied, and then on, when a third pulse is applied, etc., as is well known to the art. The output of bistable multivibrator 47 is then divided to be applied to integrator 48 and polarity inverter 49, whose output signal is applied to integrator 50. The output of integrators 48 and 50 are DC voltage levels proportional to the duty cycle of the input square waves produced by bistable multivibrator 47 and the inverted wave produced by polarity inverter 49. The output of the integrators 48 and 50 are then applied to DC discriminator 51 which passes the higher of the two voltages to the DC meter 52 where the thrust may be read.

Figure 5:
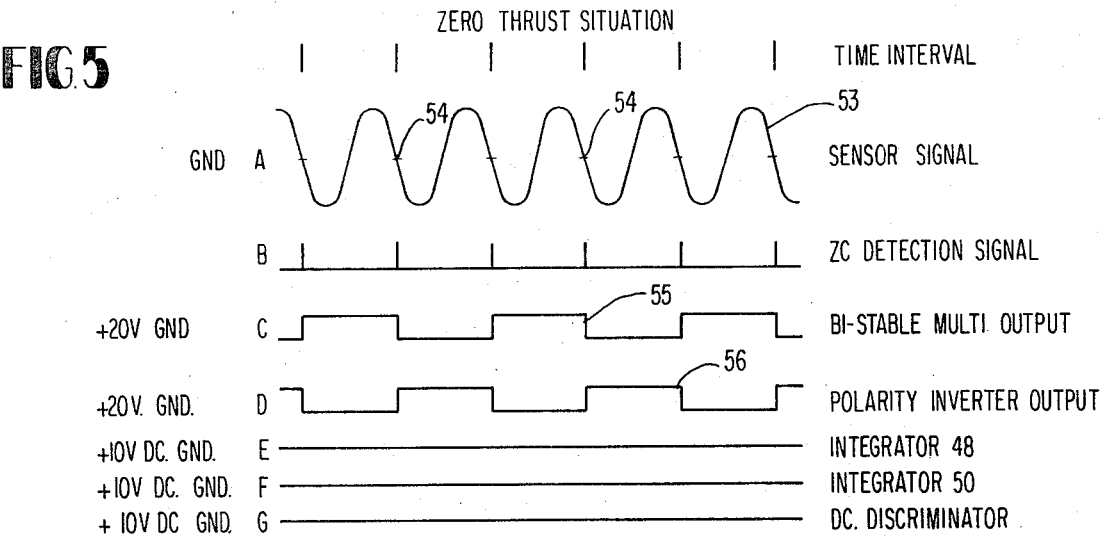
FIG. 5 shows diagrams of the voltages developed in the circuit of FIG. 3 for a no thrust condition.

Referring to FIG. 5, there are shown the output curves from each component of FIG. 4, wherein curve 53 is the sine wave output of sensor coil 44. Below curve 53 is shown the detection signal output of the zero crossover detector 46 showing the spike pulses at the zero crossover points 54. Curve 55 shows the output of bistable multivibrator 47 and curve 56 the same signal after polarity inversion. It should be noted that each period between the detection signal spikes is equal to the next and the DC output voltage from each integrator is +10 volts by way of example and therefore the output of the discriminator is +10 volts.

Figure 6:
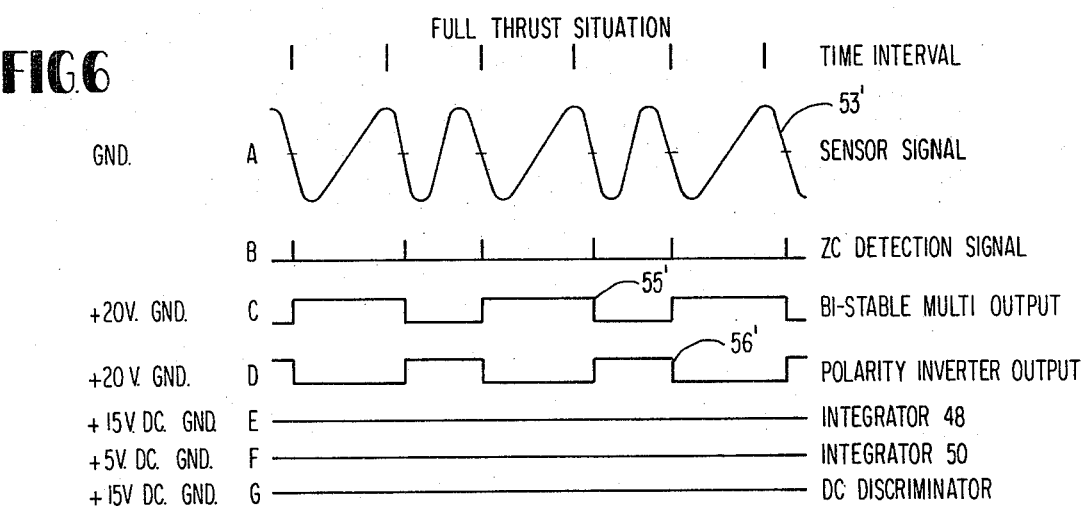
FIG. 6 shows diagrams of the voltages developed in the circuit of FIG. 3 for a thrust condition.

Referring to FIG. 6, there is shown the full torque condition in which curve 53' shows the sensor signal with the peaks unevenly spaced. This results in a square wave from the bistable multivibrator 47 with the on and off times unequal as shown in curves 55' and 56'. One will recognize that the duty cycle of these waves are proportional to the movement of the intermeshed teeth 35 of rim 30 and therefore the DC voltage at the outputs of integrators 48 and 50 are also proportional to the movement of the teeth 35 of rim 30. Therefore the DC voltage read by meter 52 is proportional to thrust.

Figure 7:
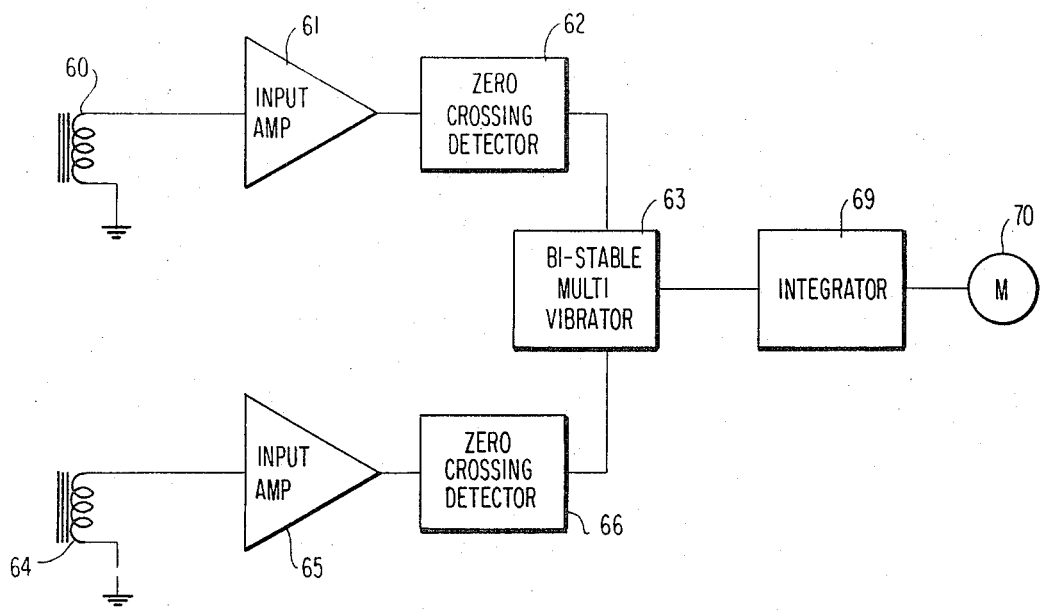
FIG. 7 shows a schematic of one circuit which will reduce the sensor information to a DC voltage proportional to thrust for the embodiment shown in FIG. 3.

Signal conditioning for the embodiment shown in FIG. 3 is accomplished in a similar manner. Referring to FIG. 7, there is shown coil 60 of sensor 42 which is connected to the input amplifier 61, the output of said amplifier being a square wave whose vertical sides occur at the zero crossing points of the input sine waves. The wave is applied to the input of zero crossing detector 62, the output of which is a spike occurring at the zero crossing point, the negative spikes being applied to one input of bistable multivibrator 63 to turn it on. Coil 64 of sensor 43 is connected in like manner to input amplifier 65 which is connected to zero crossing detector 66, the output of which are spikes occurring at the zero crossover points and the negative spikes only are applied to the second input of bistable multivibrator 63 to turn it off. The pulses from sensor coils 60 and 64 are derived from passage of gear teeth 39 and 41 past their respective sensors and the phase of the signals is proportional to the thrust, therefore the width of the on pulse coming out of bistable multivibrator 63 is proportional to the thrust while the period between pulses is proportinal to the frequency or speed. The result is that the duty cycle of the output is proportional to thrust. The output of bistable multivibrator 63 is applied to the input of integrator 69 which produces an analog DC voltage at its output proportional to the duty cycle which is then applied to meter 70 for readout.

Figure 8:
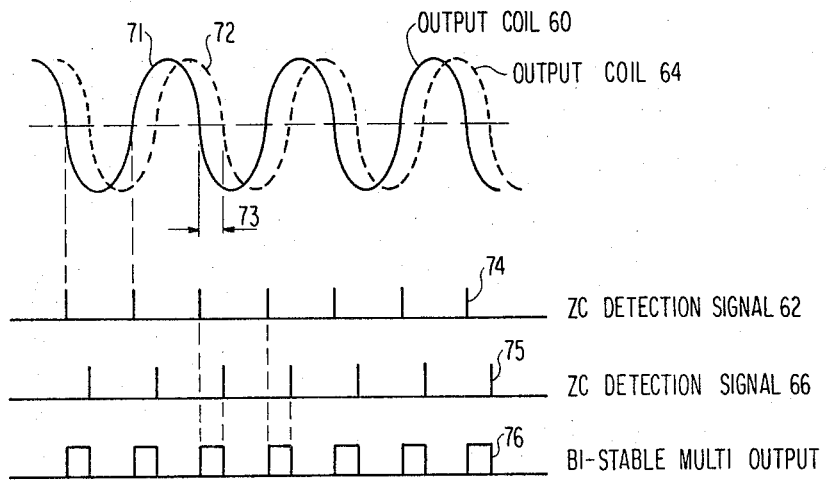
FIG. 8 shows diagrams of the voltage developed in the circuit of FIG. 7.

Referring now to FIG. 8, there is shown in curve 71 the output wave of coil 60 and in curve 72 the output wave of coil 64 having a phase difference 73 as shown. The pulses derived from the zero crossing detector 62 are shown in curve 74 and those derived from zero crossing detector 66 are shown in curve 75, therefore the output of the bistable multivibrator 63 is as shown in curve 76 since the pulse of curve 74 turns on bistable multivibrator and the pulse of curve 75 turns it off.

It should be obvious to those skilled in the art that the addition of a movable sensing means will not require a change in circuitry but will only raise or lower the frequency to be processed, the phase difference still being the same. Only the calibration of the readout meter will change.

Further, it should be obvious to those skilled in the art that the addition of other improvements in alignment compensation and the like as described in the previously mentioned patents can be applied adding only the circuitry required for such compensation.

What is claimed is:

1. A power delivery system in which power is delivered from a power driven shaft to an output power shaft and thrust is determined comprising, in combination:

a. coupling means which is torsionally and radially stiff but axially soft including
      1. first diaphragm means coupled to said driven shaft, and
      2. second diaphragm means coupled to said power shaft, said first and second diaphragm means being connected together and having a periphery composed of a first set of magnetically permeable teeth;
   b. thrust-responsive wheel means, said wheel means having a periphery composed of a second set of magnetically permeable teeth;
   c. connecting means connecting said wheel means to said coupling means for effecting angular displacement of said wheel means relative to said coupling means responsive to relative axial displacement of said first and second diaphragm means;
   d. sensing means positioned in the vicinity of said first set and said second set of teeth; and
   e. circuit means coupled to said sensing means and responsive to signals therefrom for developing a signal representative of the relative angular position of said first set of teeth with respect to said second set of teeth;

whereby an indication of thrust of the system may be developed.

2. A power delivery system according to claim 1 wherein said sensing means are magnetic sensing means.

3. A power delivery system as claimed in claim 1; in which said first set of teeth is interleaved with said second set of teeth.

4. A power delivery system as claimed in claim 1, in which said first set of teeth rotates adjacent to and parallel with said second set of teeth.

5. A power delivery system as claimed in claim 4, wherein said sensing means includes a first sensor positioned adjacent said first set of teeth and a second sensor positioned adjacent said second set of teeth.

6. A power delivery system as claimed in claim 5, wherein said first sensor and said second sensor are respectively a first magnetic sensor and a second magnetic sensor.

7. A power delivery system as claimed in claim 1, wherein said connecting means includes a resilient member and thrust bearing, said resilient member being positioned between said wheel means and one of said diaphragm means and asid thrust bearing being positioned between said wheel means and the other of said diaphragm means.

8. A power delivery system as claimed in claim 1, wherein both said first and said second diaphragm means are torsionally and radially stiff but axially soft.

9. A power delivery system as claimed in claim 1, wherein said connecting means includes a shaft member and a pin, and wherein said thrust-responsive wheel means is mounted on said shaft member, said shaft member being carried by said second diaphragm means and said wheel means having an angularly disposed slot therein into which said pin extends.

10. A power delivery system as claimed in claim 1, wherein said connecting means includes a shaft member connected to said coupling means and a pin projecting from said shaft member, said thrust-responsive wheel means being positioned about said shaft member and having an angularly disposed slot therein into which said pin extends.

11. A power delivery system as claimed in claim 10, wherein said shaft member is connected to said second diaphragm means and said thrust-responsive wheel means is connected to said first diaphragm means by a thrust bearing, and whereby thrust produced axially in one shaft causes the pin to slide in the slot rotating the wheel means with respect to the two diaphragm means.

12. A power delivery system as claimed in claim 11, wherein said first set of teeth and said second set of teeth are parts of at least one magnetic circuit, and said sensing means is a magnetic sensing means, said magnetic sensing means developing signals related to angular spacing between the teeth of said first set of teeth and those of said second set of teeth.

13. A power delivery system as claimed in claim 1, further including indicator means responsive to output of said circuit means for providing an indication of thrust of the power shaft.

* * * * *